United States Patent [19]

Clark

[11] 4,114,443

[45] Sep. 19, 1978

[54] FREEZE THAW INDICATOR

[76] Inventor: Trevor Percival Clark, 3650 Sunnycrest Dr, North Vancouver, B.C., Canada, V7R 3C6

[21] Appl. No.: 697,716

[22] Filed: Jun. 21, 1976

[30] Foreign Application Priority Data

Jun. 26, 1975 [GB] United Kingdom .............. 27054/75

[51] Int. Cl.² ............................................. G01K 11/06
[52] U.S. Cl. ........................................ 73/358; 73/356; 116/114.5
[58] Field of Search ............ 116/114.5, 114 Y, 114 V; 73/358, 356; 426/88

[56] References Cited

U.S. PATENT DOCUMENTS 3,077,177  2/1963  Winchell .......................... 116/114 V
3,701,282  10/1972  Peterson .......................... 116/114.5

OTHER PUBLICATIONS

The Merk Index; 1968, p. 811.

Primary Examiner—S. Clement Swisher
Assistant Examiner—Denis E. Corr

[57] ABSTRACT

An indicating device for evidencing thawing temperatures in a food storage compartment of a freezer having a container having an upper transparent portion and a lower opaque portion provided with inward projections. Colored water can be frozen in place within the opaque portion of the container and the container then set on it side in the freezer compartment. The projections hold the ice in place in the opaque portion of the container so that the extent of thawing is evidenced by the presence of water in the transparent portion of the container in the event of a rise in temperature in the freezer compartment.

4 Claims, 2 Drawing Figures

FREEZE THAW INDICATOR

BACKGROUND OF THE INVENTION

1. Field of the Invention

This invention relates to devices for indicating when a package of frozen food stored in a freezing chest may have thawed for a sufficient period of time for the food to deteriorate.

2. Prior Art

The process of quick freezing as applied to food and other products enables the food, when maintained in a frozen condition, to be preserved in its original fresh condition for an indefinite period of time. Frozen food, if thawed, can be re-frozen and maintained in a palatable and non-dangerous condition provided that it has not remained in its thawed condition for an extended period of time.

It is considered that to re-freeze food that has been thawed out is a dangerous practise since bacteria can propagate at a prodigious rate unless maintained in a frozen condition.

In some instances, freezer chests have been fitted with recording thermometers, however, this only indicates that maximum temperature has been reached, but gives no indication whether the food has reached a condition of complete thaw before power was re-established to re-freeze the food. Even if the duration of power failure is known, it will not establish whether the contents of the freezing compartment have thawed out, due to variences in the insulative characteristics of the equipment.

Some thaw indicators have been developed which indicate whether thawing has taken place but they do not distinguish whether thawing was superficial or complete. They, therefore, do not indicate any quantitative measure of whether the food merely started to thaw or did, in fact, thaw out completely. Therefore, it can not be known whether the food has been subjected to the dangerous condition of being completely thawed and then re-frozen.

These devices depend on the expansion of the ice to break a frangible partition, so that, if the temperature of the freezer rises above the melting point of the liquid, even for a short period of time, liquid from one compartment flows into the other compartment where it reacts with indicators to cause a calour change which is irreversible.

There are several major objections to devices of this type. They are very difficult and expensive to manufacture. Being of a fragile nature, they can be accidentally broken to give false readings. Once frozen, they can not be thawed and re-used. Consequently, they must be discarded whenever it becomes necessary to de-frost the refrigerator or if they have been activated on one occasion. They do not give any quantitative indication as to whether a superficial thawing or a complete thaw has taken place. Many indicators do not provide permanent color retention and many show little or no color if maintained in a frozen condition for long periods of time. Examples of such failures are evident in the use of phenolphthalein or methyl orange.

SUMMARY OF THE INVENTION

The present invention provides a thaw indicator which can be re-used after thawing.

The thaw indicator of the present invention, does not have multiple compartments or chemicals, and being without fragile seals or clamps is inexpensive to manufacture. The absence of these fragile seals and possibility of clamp failure provides freedom from leakage and subsequent false indication of thawing.

The present invention provides a means of quantitatively determining whether a superficial thaw has occured or whether a period of complete thaw has taken place.

The thaw indicator of the present invention includes a tube formed of a flexible material which is sealed at both ends, substantially half the length of the tube being rendered opaque, and the other half being transparent and a coloured liquid which has substantially the same freezing and melting points as water in the tube and in an amount sufficient so that when the tube is suspended in a position in which the opaque portion is lowermost the liquid is contained entirely within the opaque portion of the tube.

Detailed description following, related to drawings, gives exemplification of apparatus according to the invention which, however, is capable of expression in means other than those particularly described and illustrated.

DETAILED DESCRIPTION

Figure 1:
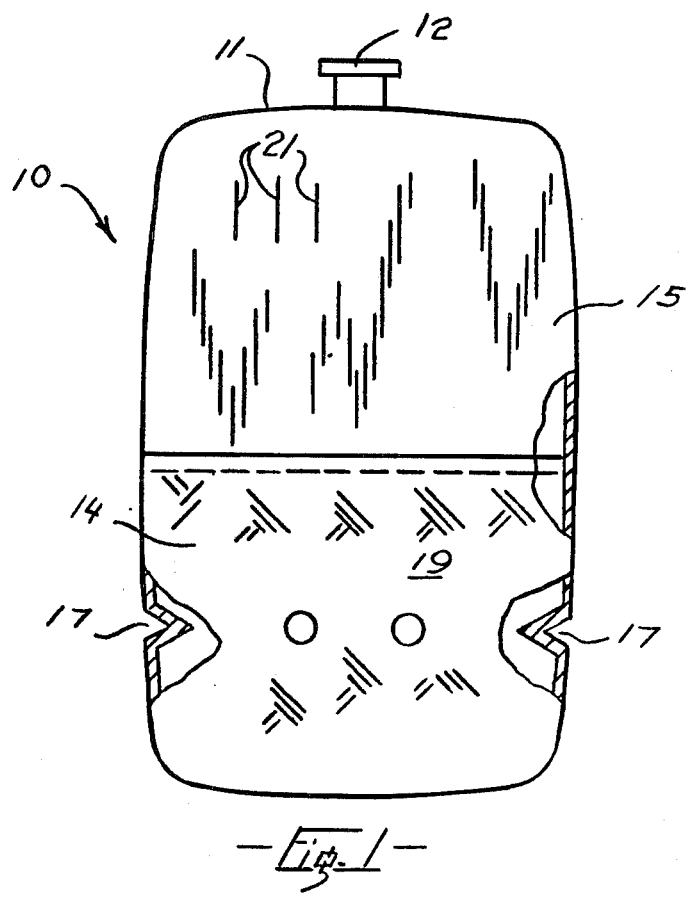
FIG. 1 is an elevation of the device in an upright position, portions removed for clarity of illustration.

Referring to the drawings, the indicator of the invention includes a tubular casing 10 which is closed at one end 11 and has a closure cap 12 at the opposite end made of a transparent thermoplastic material, sufficiently stiff so that it can stand in an upright position, FIG. 1.

The lower half 14 of the casing, is rendered opaque as by colouring or frosting or by application of decals or labels thereto, the other half 15 of the casing being untreated so that contents of the casing are visible only through the upper half. The opague half is provided with inward projections 17 at intervals along its length.

The casing contains a volume of water 19 which is coloured, the volume of water being sufficient so that when the casing is upright, i.e. with the transparent portion 15 upwards, the water is contained entirely within the opaque portion 14. Colouring used to colour the water can be any suitable type of dye or food colouring which is harmless when ingested. A suitable colouring is phenol red adjusted to its red colour range by any convenient harmless dilute alkaline, such as sodium, ammonium, potassium, phosphate, carbonate or hydroxide.

Figure 2:
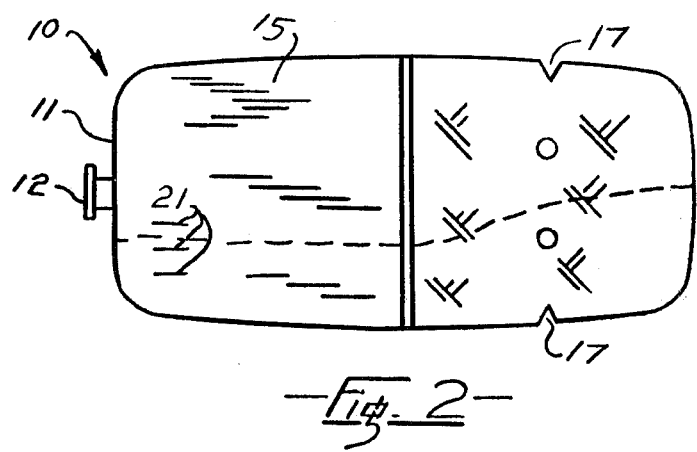
FIG. 2 is a central sectional view of the device showing in solid outline the position of the fluid therein in a frozen condition and, in broken outline the level of the fluid in a thawed condition.

In use the device is placed in a freezer compartment in the upright position, FIG. 1, and the coloured water frozen within the opaque portion, and is then laid on its side. FIG. 2, in the freezer compartment where it is clearly visible. The frozen mass of ice will not side into the clear or transparent portion due to the obstruction provided by the projections 17, however, in the event that temperatures within the freezer compartment rise sufficiently to thaw the water, the water will run into the transparent portion of the casing and thus afford evidence of the temperature change. Duration of time of exposure to thawing condition can be judged by the volume of water which may have been frozen in the transparent portion of the casing. Indicator marks, severally 21, on the sides of the transparent portion of the casing can be used to gauge the extent of thawing conditions.

To reset the indicator for re-use, it is only necessary to thaw the water and re-place the indicator in a freezer compartment in the upright position as above described.

It will be understood that although flexible materials such as thermoplastic are the most suitable materials from which the casing can be made in view of expansion of water to ice, the use of glass bottles and the like suitably shaped to accommodate expansion of water to ice, would be acceptable.

I claim:

1. A freeze thaw indicator for evidencing thawing conditions in a food storage compartment of a freezer comprising:
   (a) a container having an upper transparent portion and a lower opaque portion adapted to be partially filled with a coloured liquid within only the opaque portion having substantially the same thawing temperature as water,
   (b) a plurality of projections extending inwardly from side walls of the opaque portion of the container for inhibiting movement of frozen liquid into the transparent portion of the container but permitting movement of melted liquid into the transparent portion when the container is placed in a horizontal position.

2. An indicator as claimed in claim 1 including incicator marks on the transparent portion of the casing for indicating volume of the liquid in liquid stage in the container when the container is disposed horizontally.

3. An indicator as claimed in claim 1 in which the liquid is a dye in solution with water.

4. An indicator as claimed in claim 1 which liquid is an aqueous solution phenol red adjusted to suitable colour by a dilute alkaline.

* * * * *